(12) United States Patent
Leidel et al.

(10) Patent No.: US 11,761,760 B2
(45) Date of Patent: *Sep. 19, 2023

(54) DIGITAL LEVEL

(71) Applicant: Milwaukee Electric Tool Corporation, Brookfield, WI (US)

(72) Inventors: Matthew Leidel, Wind Lake, WI (US); Eric Mackey, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,780

(22) Filed: Dec. 22, 2021

(65) Prior Publication Data

US 2022/0113133 A1    Apr. 14, 2022

Related U.S. Application Data (63) Continuation of application No. 16/376,786, filed on Apr. 5, 2019, now Pat. No. 11,221,215, which is a continuation of application No. PCT/US2019/022967, filed on Mar. 19, 2019.

(60) Provisional application No. 62/645,417, filed on Mar. 20, 2018.

(51) Int. Cl.
   *G01C 9/06*    (2006.01)
(52) U.S. Cl.
   CPC ......... *G01C 9/06* (2013.01); *G01C 2009/066* (2013.01)
(58) Field of Classification Search
   USPC ........................................ 33/366.23, 366.11
   See application file for complete search history.

(56) References Cited

U.S. PATENT DOCUMENTS

| | | | |
|---|---|---|---|
| 3,738,015 A * | 6/1973 | De Jong | G01C 9/28 33/379 |
| 4,590,680 A | 5/1986 | Hanchett et al. | |
| 5,031,329 A | 7/1991 | Smallidge | |
| 5,218,771 A | 6/1993 | Redford | |
| 6,128,076 A | 10/2000 | Sackett | |
| 6,836,972 B2 * | 1/2005 | Drahos | G01C 9/06 33/366.11 |
| 7,204,029 B2 * | 4/2007 | Tran | G01C 9/26 33/379 |
| 7,298,888 B2 | 11/2007 | Hamar | |
| 7,472,487 B2 * | 1/2009 | Tran | G01C 9/28 33/379 |

(Continued)

FOREIGN PATENT DOCUMENTS

| | | |
|---|---|---|
| CN | 102928419 A | 2/2013 |
| CN | 107076556 A | 8/2017 |

(Continued)

OTHER PUBLICATIONS

International Search Report and Written Opinion for International Application No. PCT/US2019/022967, dated Jul. 8, 2019, 13 pages.

*Primary Examiner* — Christopher W Fulton
(74) *Attorney, Agent, or Firm* — Reinhart Boerner Van Deuren s.c.

(57) ABSTRACT

A level, such as a digital level, with various features or embodiments, such as an ultrasonically welded lens covering a display screen, a pipe insert molded in front of a light sensor, one or more button assemblies, and cartridge assemblies that are used to secure compartments within the frame of a level.

21 Claims, 10 Drawing Sheets

(56) References Cited

U.S. PATENT DOCUMENTS

| | | | |
|---|---|---|---|
| 7,595,479 B2* | 9/2009 | Luo | G01C 9/06 250/221 |
| 10,001,371 B2 | 6/2018 | Neitzell et al. | |
| 10,436,584 B2 | 10/2019 | Gray et al. | |
| 10,731,982 B2 | 8/2020 | Neitzell et al. | |
| 11,221,215 B2* | 1/2022 | Leidel | G01C 9/02 |
| 2004/0194329 A1 | 10/2004 | Drahos et al. | |
| 2005/0166410 A1 | 8/2005 | Richter et al. | |
| 2007/0180719 A1 | 8/2007 | Donnelly et al. | |
| 2009/0260241 A1 | 10/2009 | Zhang | |
| 2011/0119938 A1 | 5/2011 | Kildevaeld | |
| 2011/0162945 A1 | 7/2011 | Chen | |
| 2013/0037704 A1 | 2/2013 | Lee et al. | |
| 2016/0138916 A1 | 5/2016 | Neitzell et al. | |
| 2016/0309564 A1 | 10/2016 | Jia et al. | |
| 2019/0226845 A1 | 7/2019 | Leidel et al. | |
| 2020/0035201 A1 | 1/2020 | Tang | |

FOREIGN PATENT DOCUMENTS

| | | |
|---|---|---|
| CN | 108962191 | 12/2018 |
| DE | 202006014576 U1 | 1/2008 |
| GB | 1423934 A | 2/1976 |
| KR | 10-1383913 | 4/2014 |

\* cited by examiner

DIGITAL LEVEL

CROSS-REFERENCE TO RELATED PATENT APPLICATIONS

This application is a continuation of U.S. application Ser. No. 16/376,786, filed Apr. 5, 2019, which issued as U.S. Pat. No. 11,221,215 on Jan. 11, 2022, which is a continuation of International Application No. PCT/US2019/022967, filed on Mar. 19, 2019, which claims priority from U.S. Application No. 62/645,417, filed Mar. 20, 2018, the contents of which are incorporated herein in their entireties.

BACKGROUND OF THE INVENTION

The present invention relates generally to the field of tools. The present invention relates specifically to a tool, such as a level, that includes a digital level sensor, a digital display and/or other electronic components.

Levels are used for a variety of applications, particularly in the building and construction trades. Traditionally, to measure orientation a level uses one or more vials that contain a liquid (e.g., ethanol) and a small bubble of gas (e.g., air). The walls of the vial are arcuate-shaped such that when the level is placed on a sufficiently horizontal or vertical surface, the bubble of air is aligned at or near the center of at least one of the vials.

SUMMARY OF THE INVENTION

This disclosure describes one or more embodiments of a level. In particular, this disclosure may be used with digital levels (e.g., see patent application U.S. Ser. No. 16/269,030, which issued as U.S. Pat. No. 11,092,435 on Aug. 17, 2021, for more detail).

In one embodiment a level includes a planar base surface, a top surface opposing the base surface, an orientation sensor, a controller to calculate an orientation relative to a target, a light sensing module and a display. The light sensing module measures a brightness level around the level. The light sending module includes a primary channel, a front surface defined by the primary channel that is in visual communication with an exterior of the level, a light sensor that measures the brightness level, and a light impediment between the light sensor and the primary channel. The light impediment interferes with light transiting directly from the front surface to the light sensor. Based on the measurements by the light sensing module, the display emits an image that corresponds to both the relative orientation and the measurement by the light sensor. The orientation sensor (e.g., an accelerometer, a bubble vial) measures an orientation of one of the top and bottom surfaces with respect to a perceived direction of the force of gravity.

In another embodiment, the level comprises a planar base surface, a top surface opposing the base surface, an orientation sensor, a display and a button assembly. The button assembly includes a back wall, a plurality of sidewalls that together with the back wall define an internal cavity, a sleeve defining an internal channel, a rod aligned with and fixedly coupled to the sleeve, and a support arm coupled to the sleeve. The support arm comprises a first component that extends from a first wall of the plurality of sidewalls, a joint coupled to the first component, and a second component coupled to the joint and the sleeve. The orientation sensor measures an orientation of one of the top and bottom surfaces with respect to a perceived direction of the force of gravity. The display emits an image that corresponds to the measured orientation.

In another embodiment, a level is manufactured by coupling an orientation sensor to a level. The orientation sensor measures an orientation of the level with respect to a perceived direction of the force of gravity. The level includes a body with a longitudinal axis that defines a cavity, a planar base surface defined by the body, and a top surface defined by the body and opposing the base surface. The cavity includes an upper channel and a lower channel. A cartridge assembly is inserted within the cavity. The cartridge assembly includes at least four cartridges. The first and third cartridges include a vertical portion and a horizontal portion. The horizontal portion is disposed within the lower channel. The second and fourth cartridges include a vertical portion and a horizontal portion with the horizontal portion disposed within the upper channel. The second and fourth cartridges' vertical portions slidably engage with the first and third cartridges' vertical portions, respectively. An electronics housing is inserted into the body between the vertical portions of the first and third cartridges and the vertical portions of the third and fourth cartridges.

In one embodiment, lenses cover display screens and are ultrasonically welded to a level's body. The ultrasonic welding creates a relatively strong or tight seal reducing the ability of liquids from entering the level around the lenses, thereby protecting electronics inside the level. A light sensor is embedded in the level and senses light that passes through a pipe that is insert-molded into the level body in front of a light sensor. Ambient light is measured by the light sensor and the measurements are used to configure the brightness of the level's displays based on the ambient lighting. The insert-molding provides another relatively strong/tight seal against liquids between the pipe and the level body.

The embodiment includes an input module with one or more button assemblies covered by a rubber keypad. A faceplate is placed over the rubber keypad and is ultrasonically welded to the level's body. Each button assembly includes a rod and a sleeve that are fixedly coupled and supported by two arms. When the arms flex in response to a button being pressed by a user, the rod is restrained to movement along the rod's longitudinal axis.

Cartridge assemblies are used to secure an electronics housing inserted in a level's frame. Each cartridge assembly is placed in the frame and the electronics housing is inserted between two cartridge assemblies. The cartridge assemblies and the electronics housing are sufficiently tightly coupled to constrain or rigidly hold the electronics compartment relative to the level body.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a level and elements thereof are shown. Various embodiments of a level discussed herein relate to purely digital levels, although it is considered that these embodiments may be used with levels that are a combination of digital and analog (e.g., levels with a combination of digital components and vials).

In one embodiment, lenses covering display screens are ultrasonically welded to the level body to create a relatively strong/tight seal against liquids (e.g., an IP65 rated seal). Lenses may be made from polycarbonate for strong impact toughness and/or other materials such as polymers with desired characteristics, such as levels of optical clarity. For digital levels, a strong liquid seal helps to protect electronics within the level body from damage that may otherwise be caused by liquid.

A pipe is insert-molded in front of a light sensor into a level's body. The light sensor measures the level of ambient lighting, and this measurement is used to configure the brightness of display(s). The insert-molding between the light-pipe and the level's body provides a seal (e.g., an IP65 seal) to protect internal electronics from liquid, as well as assisting light sensor in providing accurate measurements of ambient light.

An input module includes a faceplate that is placed over a rubber keypad and is also ultrasonically welded to the level's body. This arrangement provides the functionality of an electronic input interface while maintaining a seal against liquids to protect internal electronics while being relatively easy to manufacture. Each of the keypad's buttons overlies at least one button assembly. The button assembly includes a rod fixedly coupled to a sleeve, which is supported by support arms to selectively engage with electronics when the button is depressed. The sleeve is held in place by support arms, which themselves are fixedly secured to walls of the button assembly molded as a single piece. The arms restrain the rod to movement along the longitudinal axis of the rod and sleeve.

Cartridge assemblies secure an electronics housing that is inserted into a level's frame. Each cartridge assembly consists of two components that cooperatively engage with each other. Each cartridge assembly is placed in the level frame and is expanded to engage with channels in the level frame. The electronics housing is inserted into the level frame between two cartridge assemblies. The cartridge assembly's interior includes a protrusion that is slightly elevated, and the electronics housing includes a recess that corresponds to the protrusions, thus securing the electronics housing to a specific position within the level frame. The cartridge assemblies and the electronics housing are coupled together sufficiently tightly due to interference to constrain or rigidly hold the electronics compartment relative to the level body.

Figure 1:
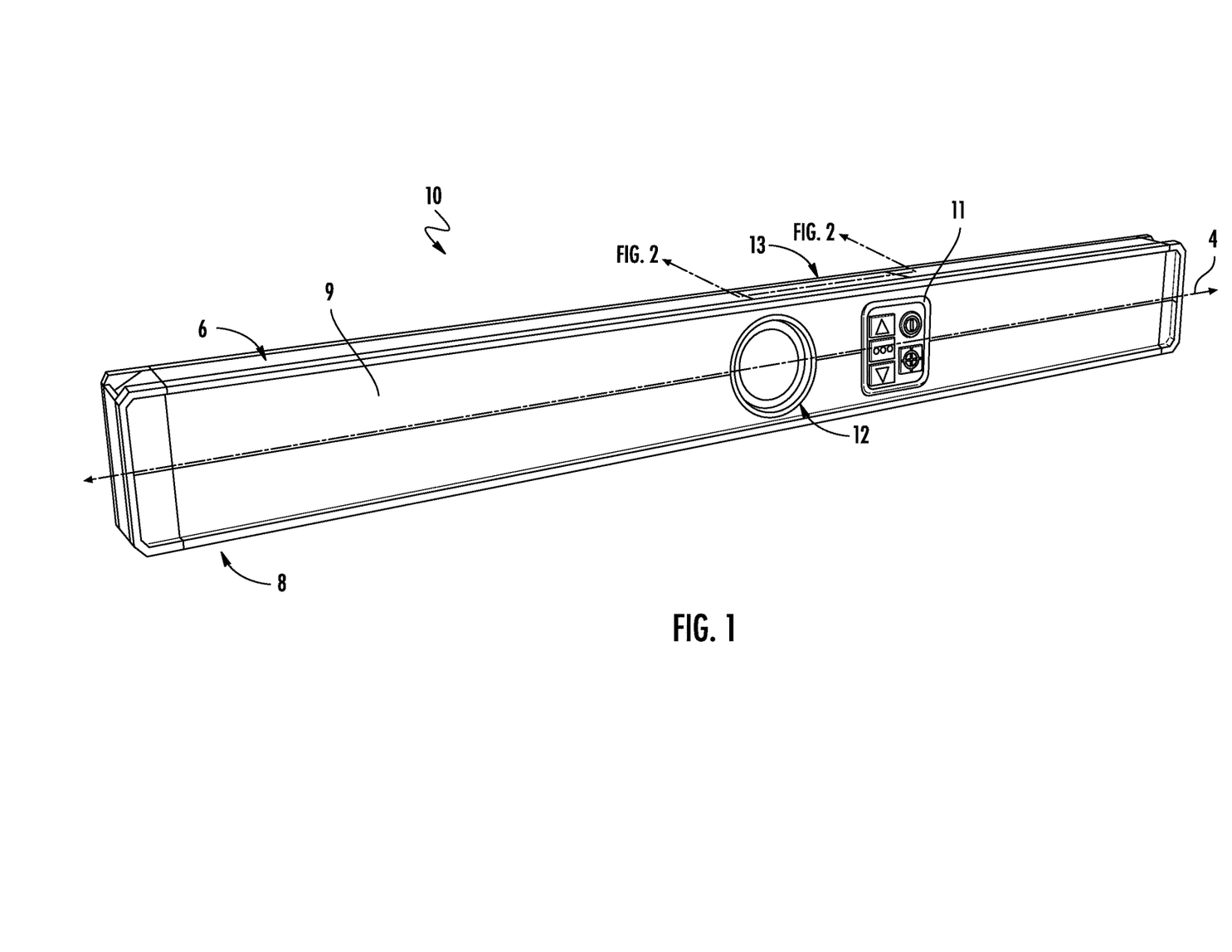
FIG. 1 is a perspective view of a level, according to an exemplary embodiment.

Referring to FIG. 1, a level, such as a digital level 10, is shown according to an exemplary embodiment. In general, level 10 comprises displays 12 and 13, top surface 6, base surface 8 and longitudinal axis 4. The level body includes a generally planar base surface 8 and an opposing top surface 6 that is generally parallel to the planar base surface 8. As will be generally understood, the base of the level is placed on a workpiece (e.g., a structure, surface, etc.) in order for the user of the level 10 to measure the degree of a surface of the workpiece, including but not limited to whether the surface is level or plumb.

Level 10 includes first measuring surfaces on a top and bottom of level 10 (from the perspective of FIG. 1). Measuring surfaces of level 10 provide very flat surfaces that permit level 10 to measure the orientation of other objects by placing one of the measuring surfaces of level 10 against the object being measured. It is considered that level 10 may have any number of measuring surfaces (e.g., 1-4).

Level 10 comprises orientation sensor 9 (e.g., a spirit vial, an accelerometer) to measure the orientation of level 10 with respect to a perceived direction of the force of gravity (e.g., aligned with the force of gravity if level 10 is stationary). In an embodiment with a digital level, controller 11 subsequently calculates on orientation of level 10 based on signals received from orientation sensor 9, and subsequently calculates a difference between the orientation of level 10 and a target orientation of level 10 (e.g., perpendicular to gravity, plumb, another selected angle).

Figure 2:
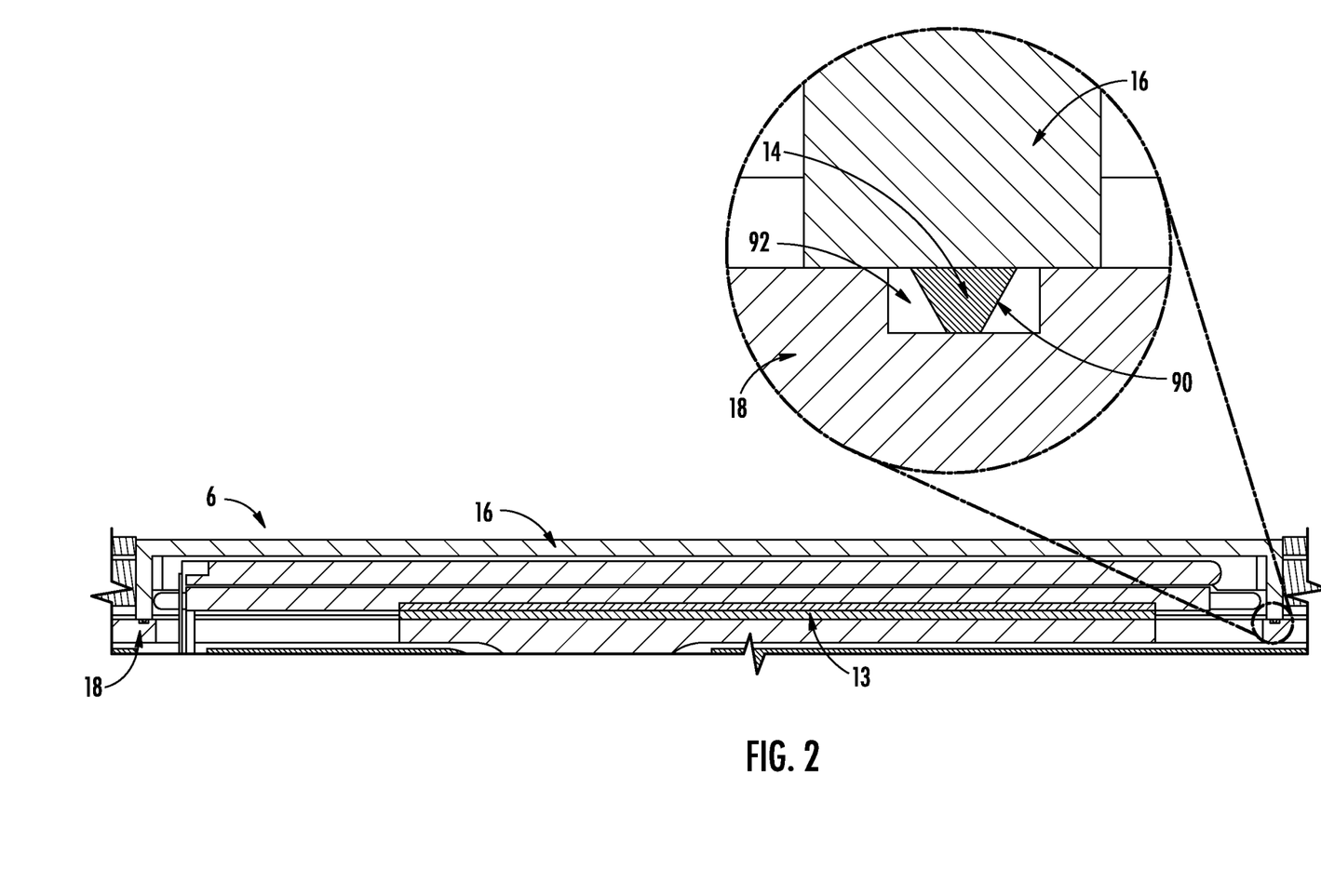
FIG. 2 is a cross-section of the display on the top surface of the level of FIG. 1, including a detailed view of the attachment of a lens to a level body, according to an exemplary embodiment.

Referring to FIG. 2, in one or more embodiments displays 12 and 13 may be any display technology (e.g., LCD, plasma, OLED, QLED, etc.). To protect displays 12 and 13 from moisture and other contaminants, lens 16 is secured to body 18 via a seal 14 positioned around displays 12 and 13. Lens 16 is coupled to body 18 and extends to form at least part of top surface 6. Therefore, lens 16 is ultrasonically welded to level body 18 to create a strong liquid seal (e.g., IP65). Alternatively, lens 16 may be secured via silicone, such as RTV silicone. It is considered that both of display 12 and display 13 may be protected by lens 16 being ultrasonically welded to body 18 as described in one or more embodiments of this disclosure.

In one embodiment, attachment protrusion 90 of lens 16 is placed within attachment channel 92 of body 18. Subsequently, attachment protrusion 90 is ultrasonically welded to attach to body 18. A frame, such as with a material having color, may be added peripherally around lens 16 to cover or mask the ultrasonic welding.

Figure 3:
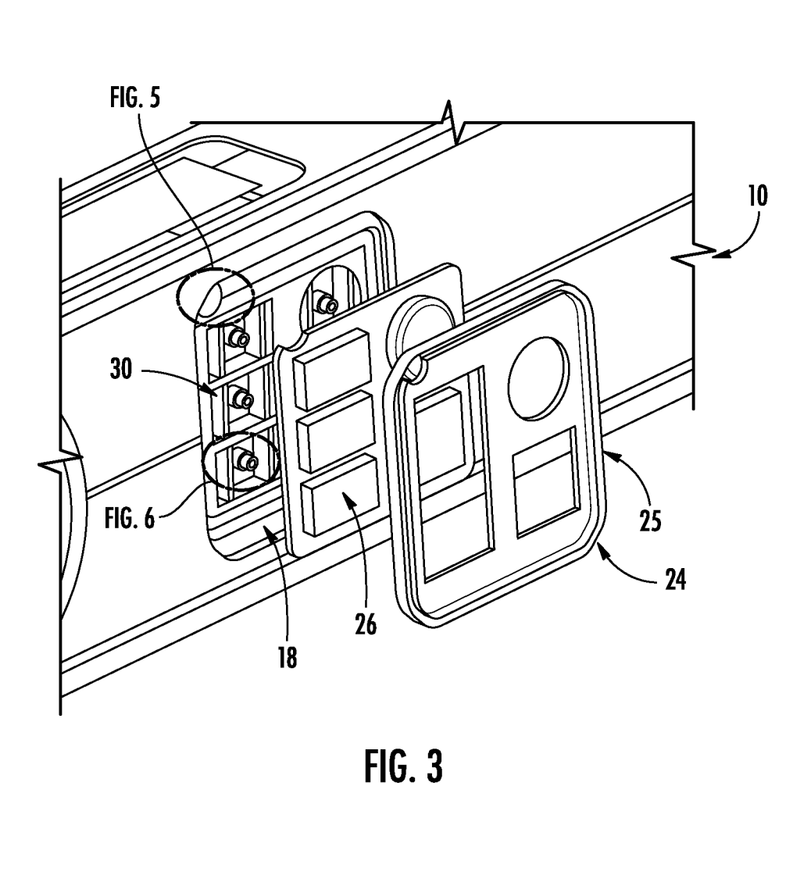
FIG. 3 is a perspective view of the components of the input module of the level of FIG. 1, according to an exemplary embodiment.
Figure 4:
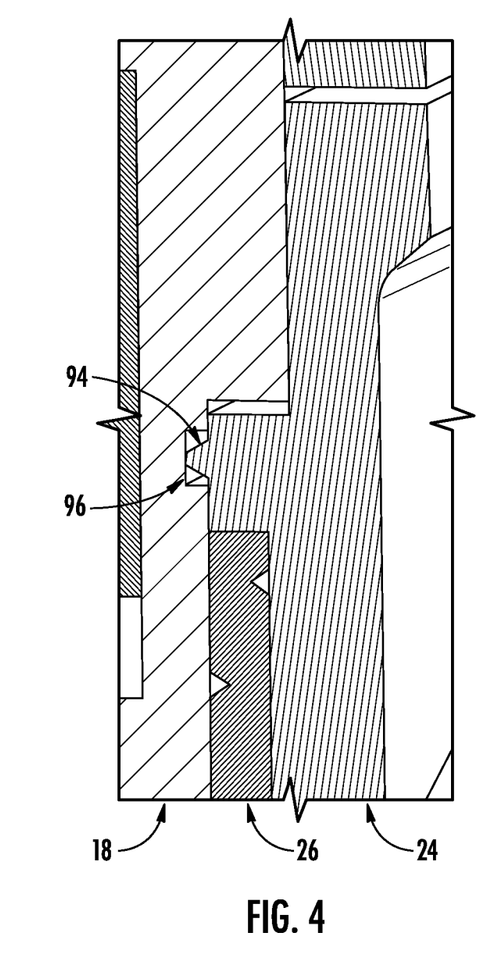
FIG. 4 is a cross-section of a seal between the face plate and the level body of the level of FIG. 3, according to an exemplary embodiment.

Referring now to FIGS. 3-4, keypad 26 is secured between faceplate 24, which in one embodiment comprises a plastic material, and body 18. To protect internal electronics from moisture and other contaminants, faceplate 24 is ultrasonically welded to body 18 (best shown in FIG. 4) to achieve an IP65 seal. Attachment protrusion 94 is placed within attachment channel 96 and subsequently ultrasonically welded. Keypad 26 is disposed between faceplate 24 and body 18. In use, when keypad 26 is depressed it engages with button assemblies 30. In at least one embodiment, body 18 includes an elastomer and keypad 26 includes a rubber. In one embodiment the periphery 25 of faceplate 24 is welded to body 18.

Figure 5:
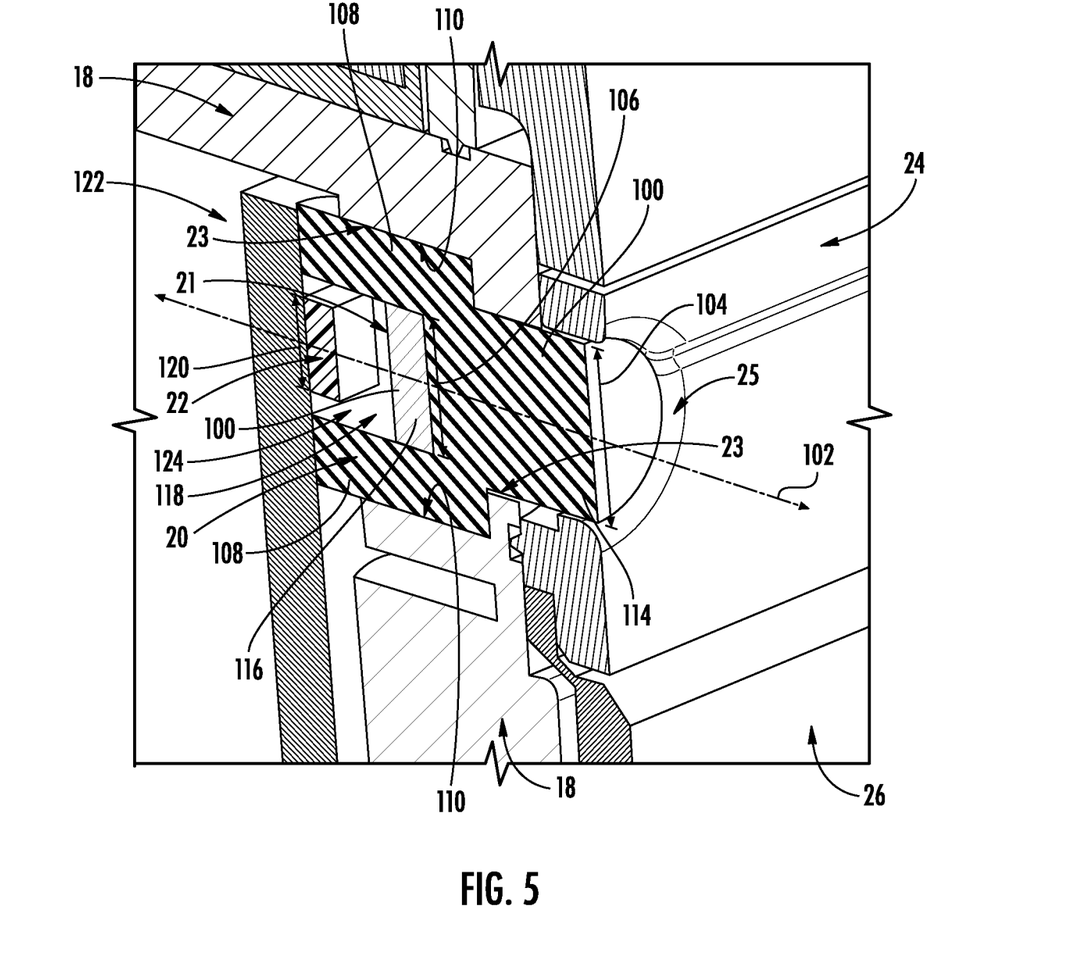
FIG. 5 is a detailed cross-section perspective view of a light tube and light sensor of the level of FIG. 3, according to an exemplary embodiment.

Referring now to FIG. 5, FIG. 5 depicts an expanded cross-section view of a portion of FIG. 3 generally near the upper-left corner of body 18 in FIG. 3. A light sensor 22 is used to measure the brightness level of the ambient light around level 10. This measurement is used to configure the brightness of displays 12 and 13 in level 10. For example, if level 10 is being used outside during a bright sunny day, light sensor 22 measures the brightness and the measurement is relied on to correspondingly adjust displays 12 and 13 to a maximum or near maximum brightness. Alternatively, if level 10 is being used inside in darker conditions, to conserve energy displays 12 and 13 are configured to be less bright.

Because light sensor 22 is located inside body 18 of level 10, pipe 20 allows light to reach light sensor 22 by first transiting through front surface 112 of pipe 20, which is defined by primary channel 100, through medium 114 of primary channel 100, reflecting and/or refracting around light impediment 21 by transiting medium 116 of side channels 108. Light then travels through internal cavity 124, which comprises a medium 118 (e.g., air) to light sensor 22. In one embodiment primary channel 100 is in visual communication with side channels 108, and side channels 108 are in visual communication with internal cavity 124. Ambient light around level 10 transits pipe 20 to light sensor 22. In one embodiment, light sensor 22 and light impediment 21 are aligned with longitudinal axis 102 of primary channel 100. To allow light to traverse the internal volume of pipe 20, it is considered that the internal volume of pipe 20 may be air (or other gasses), clear plastic (or other solid materials), or other transparent or partially transparent mediums. Light sensor 22 has width 120 that is less than width 106 of light impediment 21, which is opaque or mostly opaque to light, and as a result light must reflect, refract and/or bend around light impediment 21 to reach light sensor 22, such as via a textured material added to bottom of primary channel 100 opposite front surface 112 that disperses light prior to light sensor 22. In one embodiment light sensor 22 is fixedly coupled to a circuit board (e.g., mounted to the circuit board) and light sensor 22 transmits signals representative of measurements by light sensor 22. The circuit board is further communicatively coupled to controller 11, which calculates the orientation of level 10.

In one embodiment, primary light channel 100 and side channels 108 radially surround longitudinal axis 102 of light sensing module 122, with side channels 108 radially further from longitudinal axis 102 than light impediment 21, which side channels 108 radially surround. Primary channel 100 has a width 104 less than the width 106 of light impediment 21, thus allowing light to more easily transit around light impediment 21. Interior surface 110 of side channels 108 comprises a relatively reflective material to redirect light towards sensor (e.g., a light-colored opaque surface).

Pipe 20 filters light to light sensor 22 to aid light sensor 22 in detecting an average brightness of ambient light. For example, if level 10 is inside a building and pipe 20 happens to be axially aligned with a light source (e.g., a light bulb), pipe 20 provides an average of the ambient light to light sensor 22 to reduce a likelihood of light sensor 22 overestimating the ambient brightness.

In one embodiment, internal surface 23 of pipe 20 is relatively highly reflective, thereby propagating reflections of light through pipe 20, around light impediment 21, and to light sensor 22. For example, internal surface 23 of pipe 20 may be painted white. In another embodiment, light impediment 21 is not included in level 10 between pipe 20 and light sensor 22 and primary channel 100 comprises a textured material opposite front surface 112 to disperse light.

To protect light sensor 22 and other internal components from moisture and other contaminants, pipe 20 is insert-molded into body 18 (shown in FIG. 5). Faceplate 24 includes an opening that pipe 20 is placed within. Keypad 26 is shaped so as to not cover pipe 20 (shown in FIG. 3).

Figure 6:
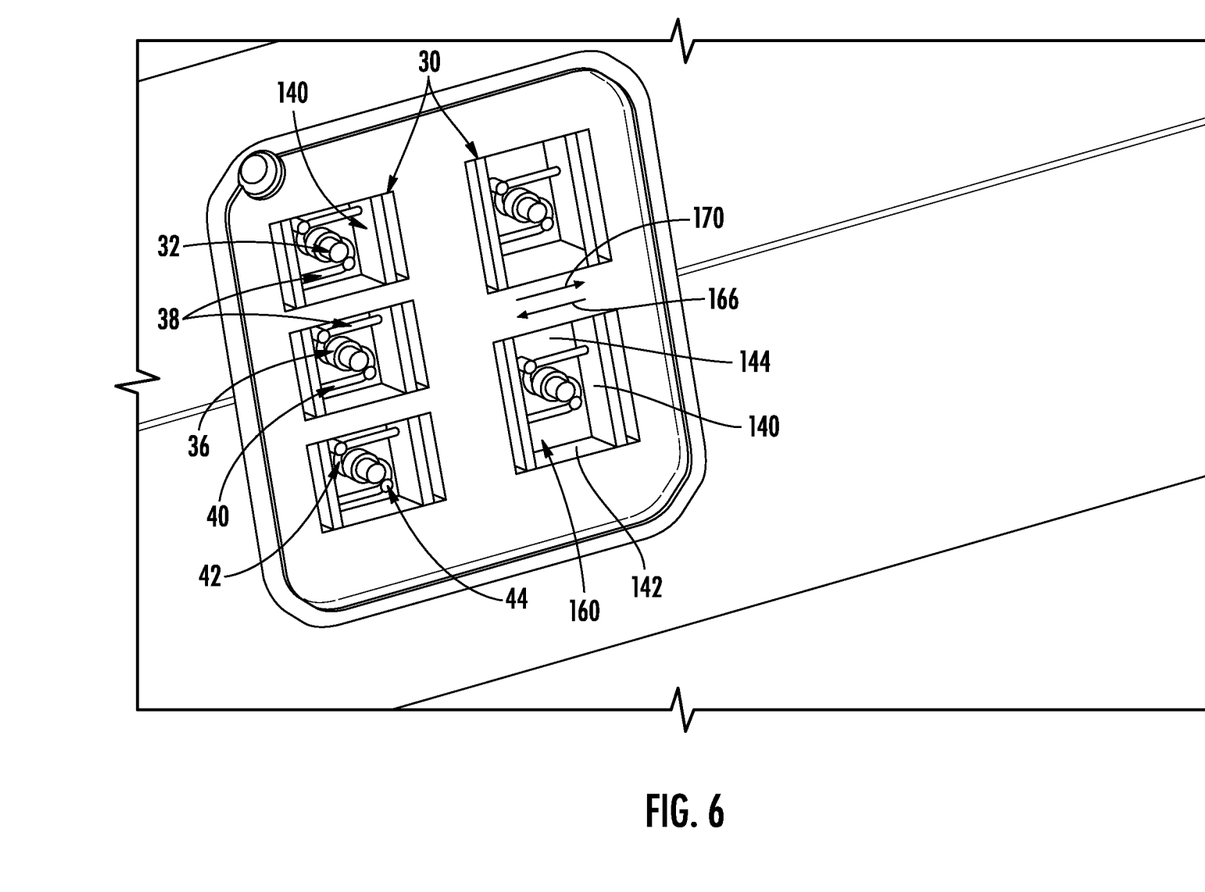
FIG. 6 is a detailed perspective view of several button assemblies of the input module of the level of FIG. 3, according to an exemplary embodiment.
Figure 7:
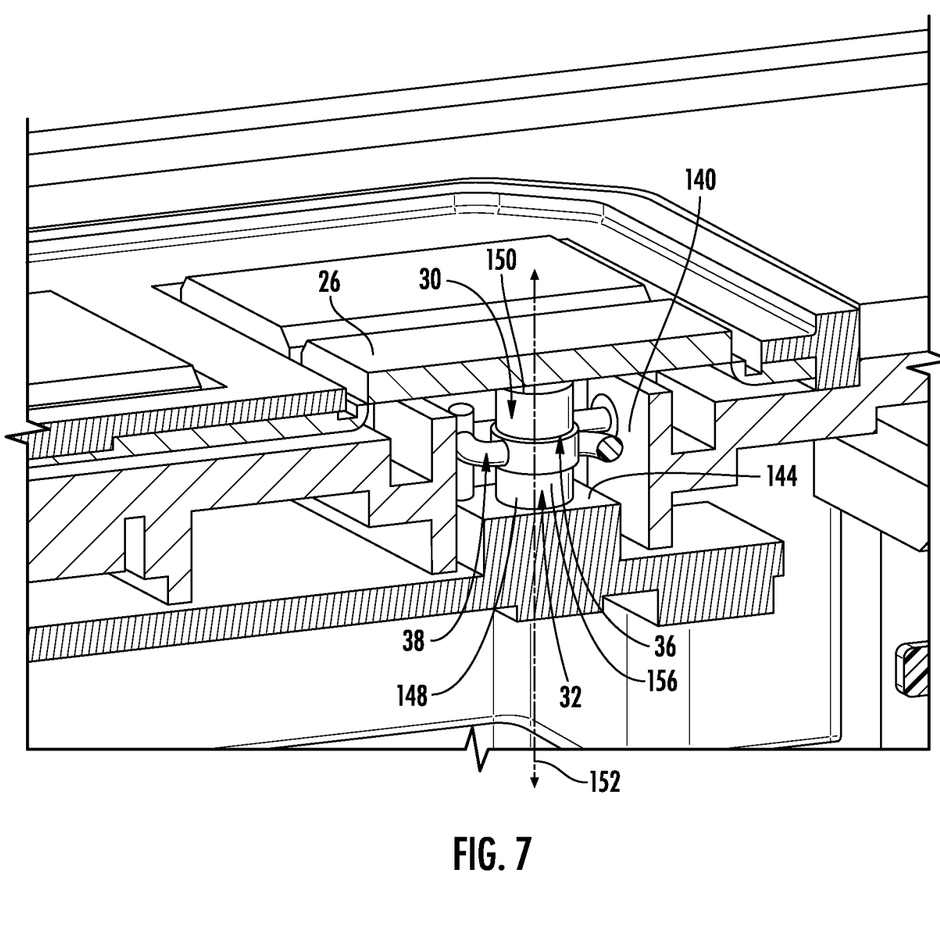
FIG. 7 is a detailed perspective view of a button assembly, according to an exemplary embodiment.

Referring to FIGS. 6-7, button assemblies 30 include a post, shown as rod 32, which is axially aligned with a collar, shown as sleeve 36. When a button on keypad 26 is depressed by a user, rod 32 and sleeve 36, which are fixedly coupled, cause support arms 38 to flex until enclosed electronically-conductive end 148 of rod 32 engages with underlying electronics (e.g., a normally-open momentary switch, a normally-closed momentary switch) to indicate that a user has depressed the associated button on keypad 26. In another embodiment, when a button on keypad 26 is depressed by a user, keypad 26 interfaces against button-facing end 150 of rod 32 and rod 32 slides along longitudinal axis 152 within internal channel 156 of sleeve 36 until enclosed electronically-conductive end 148 of rod 32 engages with underlying electronics (e.g., a normally-open momentary switch, a normally-closed momentary switch) to indicate that a user has depressed the associated button on keypad 26.

Sidewalls 142 extend between support walls 140 and, collectively with back wall 144, define cavity 160. Support walls 140 restrict travel of keypad 26 to prevent rod 32 from deflecting to a position that does not engage with the underlying electronics. Support arms 38 are fixedly secured to support walls 140 of button assembly 30. Support arm 38 includes a first component 40 that is generally perpendicular to support wall 140, a second component 42 that is curved and fixedly secured to sleeve 36, and connection joint 44 between first and second components 40 and 42. Depending on which support arm 38 within FIG. 6 is being considered, first component 40 extends along one of first direction 166 and second direction 170, which are opposite each other, and at least a portion of second component 42 extends along the other of first direction 166 and second direction 170. This support mechanism for rod 32 allows for not more than one degree of freedom for rod 32 to translate along its longitudinal axis but not in other directions. As a result, the button provides a better tactile feel for users. In one embodiment, sleeve 36, support arms 38, and rod 32 are a single molded assembly.

Referring now to FIGS. 8-11, cartridge assemblies 50 are utilized to secure electronics housing 74 within body 18. During the manufacture of level 10, two cartridge assemblies 50 are placed within body 18 and then electronics housing 74 is placed between cartridge assemblies 50 (best shown in FIG. 9).

Figure 8:
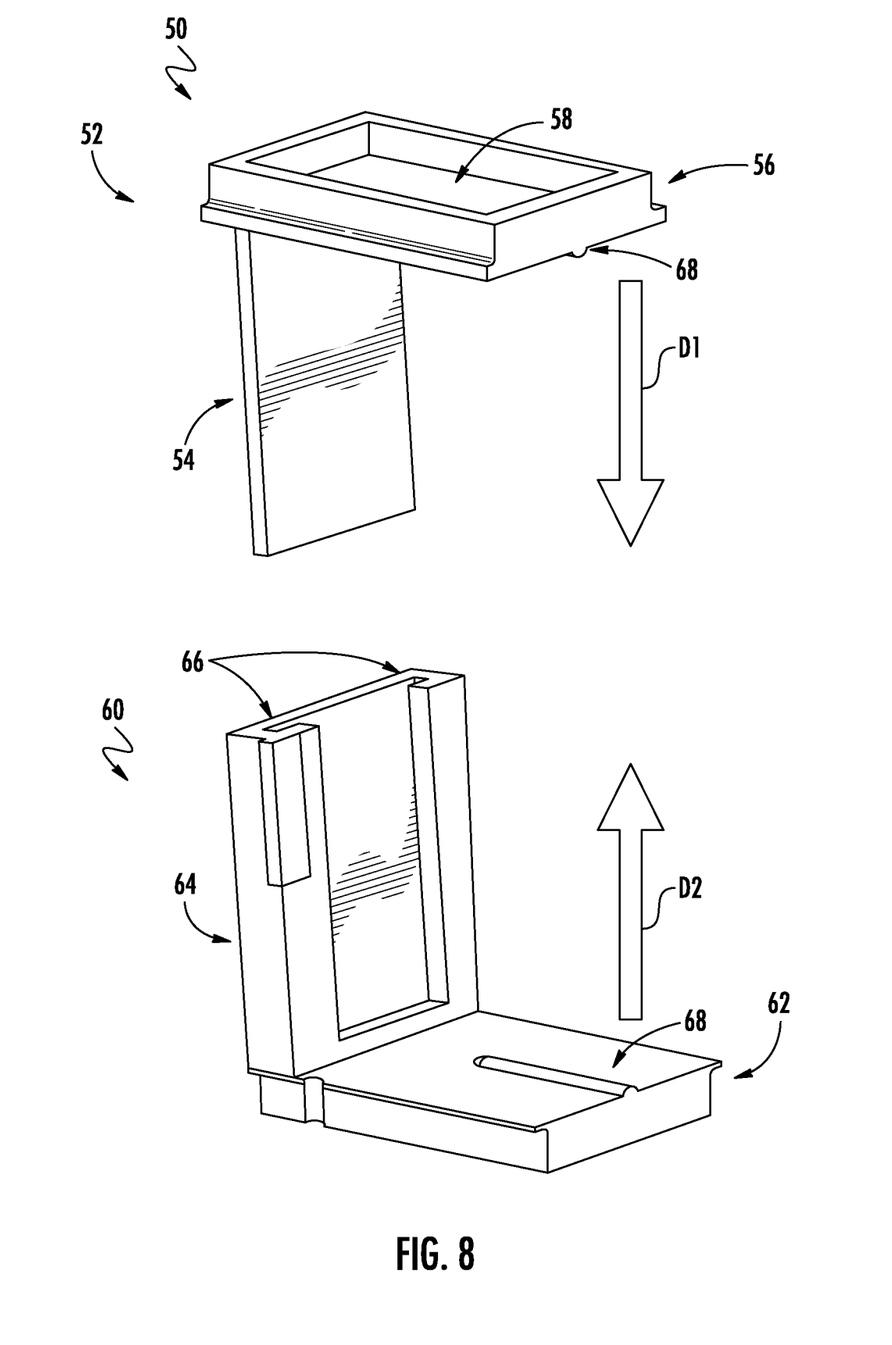
FIG. 8 is a perspective view of a cartridge assembly of the level of FIG. 1, according to an exemplary embodiment.

Cartridge assembly 50 includes a first cartridge component 52 and a second cartridge component 60. First cartridge component 52 comprises a vertical portion 54, which cooperatively engages with vertical channels 66 of vertical portion 64 of second cartridge component 60. Thus, first cartridge component 52 can slide towards and away from second cartridge component 60. First cartridge component 52 includes a horizontal portion 56 with cavity 58 oriented away from second cartridge component 60 when first and second cartridge components 52 and 60 are cooperatively engaged. Second cartridge component 60 also includes a horizontal portion 62 with a cavity that is oriented away from first cartridge component 52 when first and second cartridge components 52 and 60 are cooperatively engaged with each other.

Figure 9:
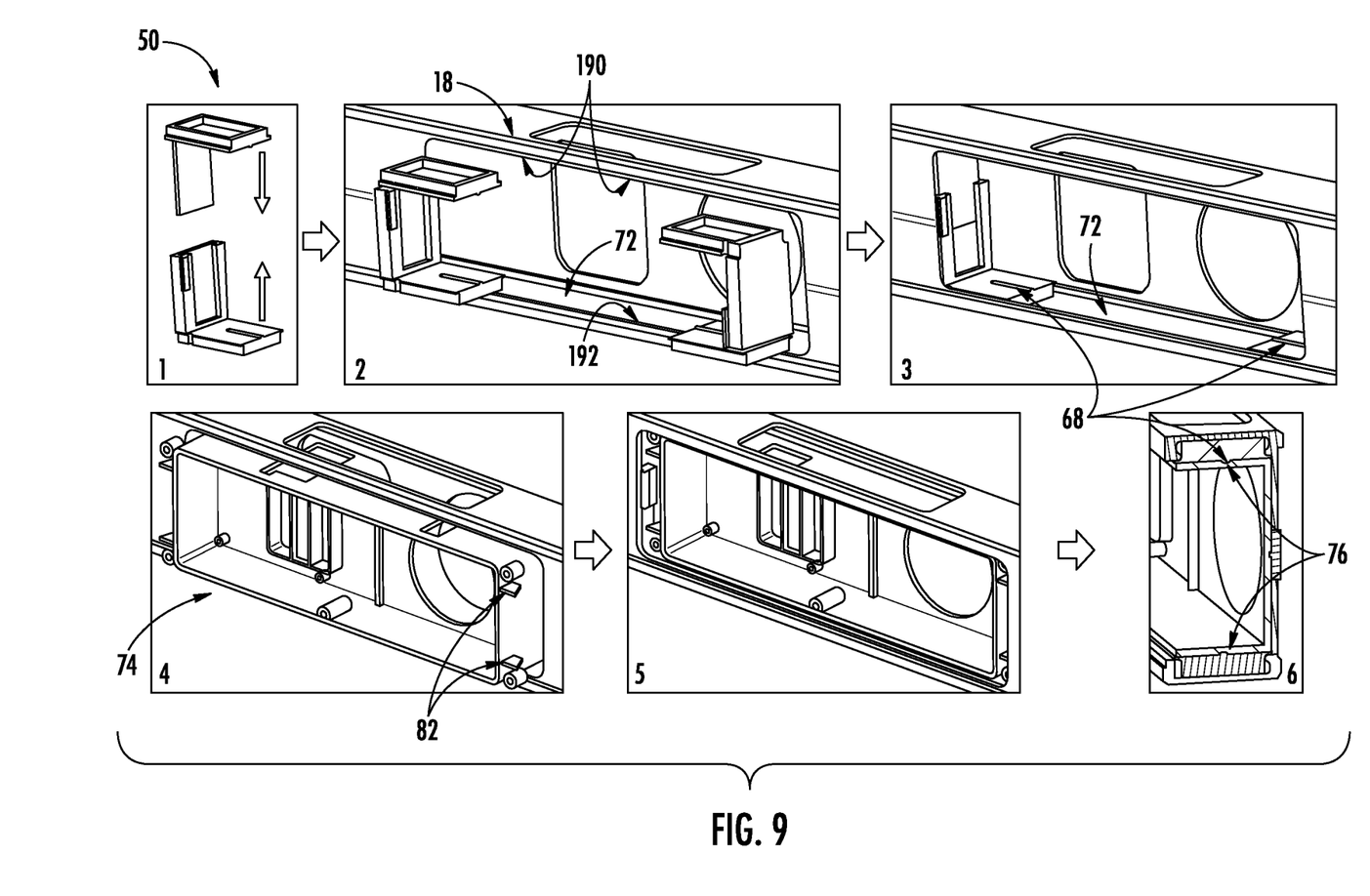
FIG. 9 is an illustrated series of steps to manufacture the level of FIG. 1, according to an exemplary process.

Referring to FIG. 9, during manufacture of level 10, cartridge assemblies 50 are placed inside body 18. To be placed inside body 18, first and second cartridge components 52 and 60 are slid towards each other, thus reducing the height of cartridge assembly 50 from the perspective of FIG. 9. Once cartridge assemblies 50 are within body 18, first and second cartridge components 52 and 60 are slid apart into upper channel 190 and lower channel 192. As a result, horizontal portions 56 and 62 of first and second cartridge components 52 and 60 are moved into channels 72 on the bottom and top of body 18 (best shown in the bottom-right image, #6, in FIG. 9).

Subsequently, electronics housing 74 is placed in body 18 between cartridge assemblies 50 (best shown in image #4 in FIG. 9). While electronics housing 74 is being placed between cartridge assemblies 50, before electronics housing 74 is within frame 70, rib 68 of cartridge assemblies 50 presses against the top and bottom surfaces of electronics housing 74. As a result, cartridge assemblies 50 press against and slightly compressively deform electronics housing 74 in the vertical direction (e.g., both up and down from the perspective of FIG. 9). Once electronics housing 74 is within frame 70, rib 68 is disposed within recess 76 of electronics housing 74 and as a result frame 70 is no longer deformed and/or less deformed by electronics housing 74. Compressive forces hold electronics housing 74 in cartridge assemblies 50. The compressive forces between the electronics housing and the cartridge assembly restrain, or rigidly, hold the electronics compartment relative to the level body.

Figure 10:
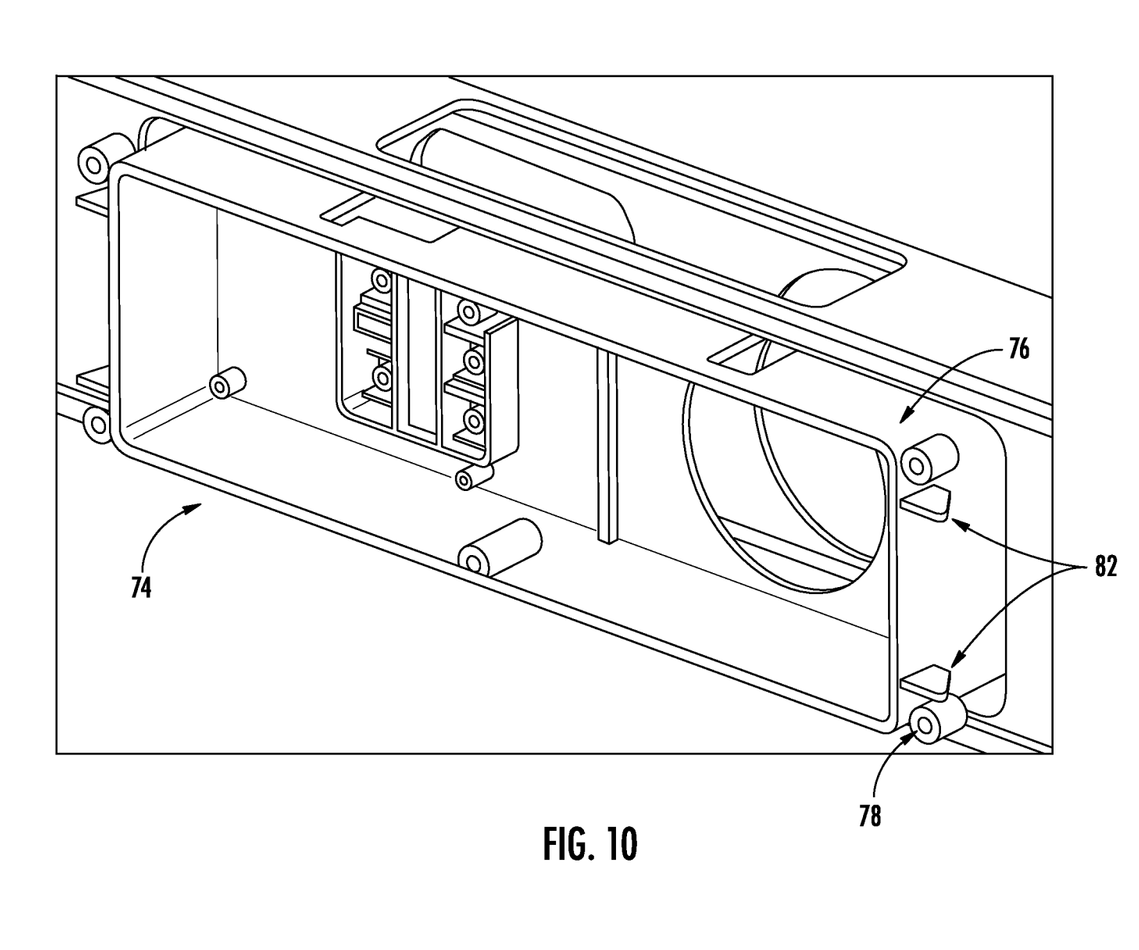
FIG. 10 is a perspective view of an electronics housing partially inserted into a level frame of the level of FIG. 1, according to an exemplary embodiment.

While rib 68 and the height of electronics housing 74 cause a tight fit between the top and bottom of electronics housing 74 and frame 70, chamfered projections 82 cause a tight fit between the left and right sides of electronics housing 74 and frame 70 (via cartridge assemblies 50). Chamfered projections 82 are located on the sides of electronics housing 74. As electronics housing 74 is placed into frame 70, chamfered projections 82 laterally press against cartridge assemblies 50. Chamfered projections 82 are angled projections with a shorter edge expanding to a longer edge. In one embodiment two chamfered projections extend outwardly from each side wall of electronic housing 74.

Figure 11:
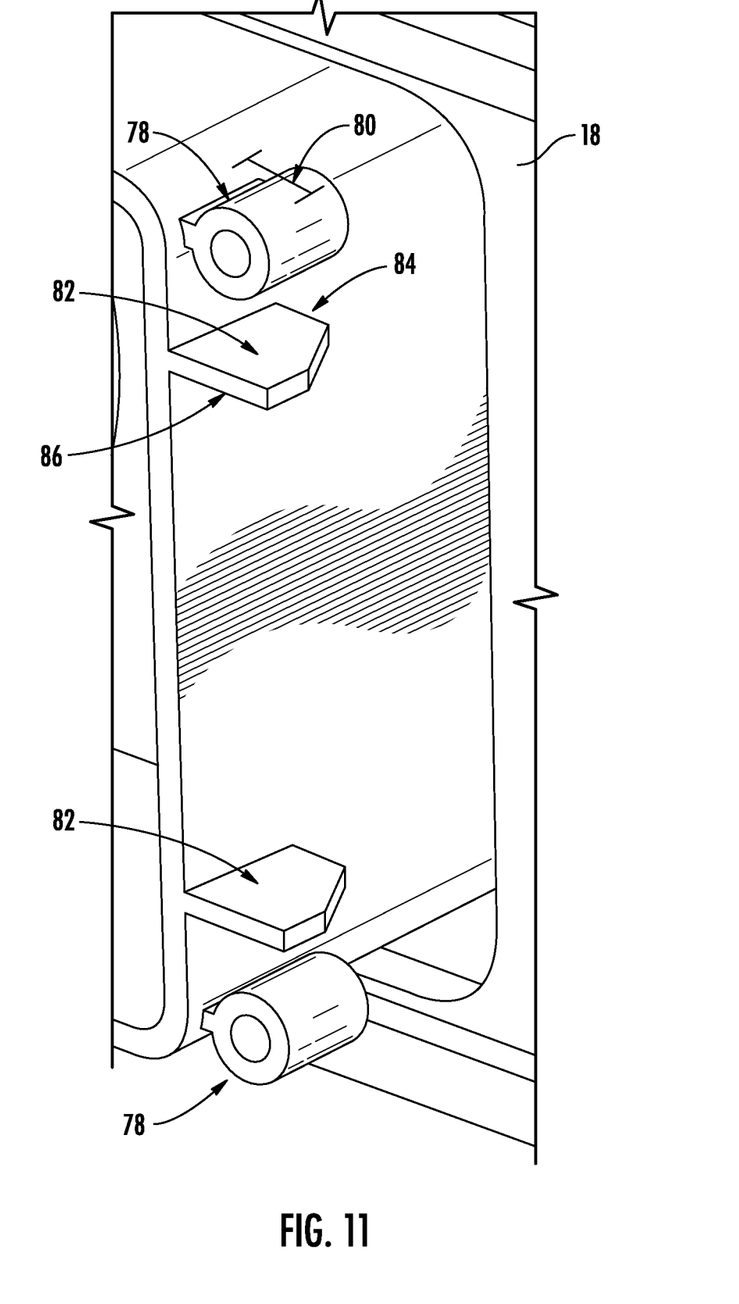
FIG. 11 is a detailed perspective view of a portion of the electronics housing of FIG. 10, according to an exemplary embodiment.

Referring now to FIG. 11, the length of the shorter edge 84 of chamfered projection 82 is not as wide as the cylinder width 80 of a threaded receiver, shown as screw receiver 78. As a result, when screw receiver 78 fits within body 18, the shorter edge 84 of chamfered projection 82 also fits within body 18. As electronics housing 74 is inserted further into body 18, chamfered projections 82 starts to press against cartridge assemblies 50 until the entire electronics housing 74 is inserted within body 18 and the larger edges 86 of chamfered projections 82 are pressing against cartridge assemblies 50.

As a result, electronics housing 74 is firmly secured within frame 70 (via cartridge assemblies 50) so that electronics housing 74 will preferably stay within a fixed orientation in regard to frame 70 after severe impacts (e.g., being dropped). In one or more embodiments electronics housing 74 and frame 70 are so tightly pressed together that they are sealed against contaminants, such as liquid.

In one or more embodiments an adhesive is placed between electronics housing 74 and frame 70 to bolster the rigid coupling of the electronics housing and the cartridge assembly. It is considered herein that the adhesive may also bolster a seal, such as a liquid seal, between the electronics housing 74 and frame 70.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

We claim:
1. A level comprising:
a planar base surface;
a top surface opposing the base surface;
an orientation sensor configured to measure an orientation of one of the top and base surfaces with respect to a perceived direction of the force of gravity;

a display that emits an image that corresponds to the measured orientation; and
a button assembly comprising:
  a back wall;
  a plurality of sidewalls, the back wall and the plurality of sidewalls defining an internal cavity;
  a sleeve defining an internal channel;
  a rod extending within the internal channel, the rod aligned with and fixedly coupled to the sleeve; and
  a support arm coupled to the sleeve, the support arm comprising:
    a first component that extends from a first wall of the plurality of sidewalls;
    a joint coupled to the first component; and
    a second component coupled to the joint and the sleeve.

2. The level of claim 1, wherein the first component extends from the first wall to the joint in a first direction, and wherein the second component extends from the joint to the sleeve at least partially in a second direction opposite the first direction.

3. The level of claim 2, wherein the second component is arcuate-shaped.

4. The level of claim 2, the support arm being a first support arm and the joint being a first joint, the button assembly further comprising a second support arm coupled to the sleeve, the second support arm comprising:
  a third component that extends from a second wall of the plurality of sidewalls;
  a second joint coupled to the first component; and
  a fourth component coupled to the second joint and the sleeve.

5. The level of claim 4, wherein the third component extends from the second wall in the second direction, and wherein the fourth component extends from the second joint to the sleeve at least partially in the first direction.

6. The level of claim 5, wherein the second and fourth components are arcuate-shaped.

7. The level of claim 1, wherein the button assembly is a plurality of button assemblies, each button assembly comprising:
  a back wall;
  a plurality of sidewalls, the back wall and the plurality of sidewalls defining an internal cavity;
  a sleeve defining an internal channel;
  a rod extending within the internal channel, the rod aligned with and fixedly coupled to the sleeve; and
  a support arm coupled to the sleeve, the support arm comprising:
    a first component that extends from a first wall of the plurality of sidewalls;
    a joint coupled to the first component; and
    a second component coupled to the joint and the sleeve.

8. A level comprising:
a planar base surface;
a top surface opposing the base surface;
an orientation sensor configured to measure an orientation of one of the top and base surfaces with respect to the force of gravity;
a controller that calculates an orientation difference between the measured orientation and a target orientation;
a light sensing module that measures a brightness level, the light sensing module comprising:
  a front surface in visual communication with an exterior of the level;
  a light sensor that measures the brightness level;
  a light impediment between the light sensor and the front surface, the light impediment configured to interfere with light transiting from the front surface to the light sensor; and
  a side channel in visual communication with the front surface and the light sensor, wherein the side channel surrounds the light impediment; and
a display that emits an image that corresponds to the orientation difference, the image comprising a brightness that is at least partly based on a measurement by the light sensing module.

9. The level of claim 8, comprising a primary channel, the primary channel comprising a longitudinal axis, wherein each of the light sensor and the light impediment are aligned with the longitudinal axis of the primary channel.

10. The level of claim 8, wherein a width of the light impediment is greater than a width of the light sensor.

11. The level of claim 8, wherein the light impediment is opaque to light.

12. The level of claim 8, wherein the side channel radially surrounds the light impediment.

13. The level of claim 8, the side channel defining a reflective interior surface that faces towards the primary channel's longitudinal axis.

14. The level of claim 8, the light sensing module comprising a cavity between the side channel and the light sensor.

15. The level of claim 8, the level comprising a circuit board that is communicatively coupled to the controller and orientation sensor, and fixedly coupled to the light sensor.

16. A method of manufacturing a level comprising:
coupling an orientation sensor to a level, the orientation sensor configured to measure an orientation of the level with respect to a perceived direction of the force of gravity; the level comprising:
  a body comprising a longitudinal axis, the body defining a cavity that comprises an upper channel and a lower channel;
  a planar base surface defined by the body; and
  a top surface defined by the body and opposing the base surface;
inserting a cartridge assembly within the cavity, the cartridge assembly comprising:
  a first cartridge comprising a vertical portion and a horizontal portion, the horizontal portion disposed within the lower channel;
  a second cartridge comprising a vertical portion and a horizontal portion, the horizontal portion disposed within the upper channel, and the second cartridge's vertical portion slidably engaged with the first cartridge's vertical portion such that the first cartridge and the second cartridge define a first height that varies as the first cartridge slides with respect to the second cartridge;
  a third cartridge comprising a vertical portion and a horizontal portion, the horizontal portion disposed within the lower channel;
  a fourth cartridge comprising a vertical portion and a horizontal portion, the horizontal portion disposed within the upper channel, and the fourth cartridge's vertical portion slidably engaged with the third cartridge's vertical portion such that the third cartridge and the fourth cartridge define a second height that varies as the third cartridge slides with respect to the fourth cartridge;

inserting an electronics housing into the body between the vertical portions of the first and third cartridges and the vertical portions of the third and fourth cartridges.

17. The method of claim 16, wherein the first cartridge's horizontal portion comprises a first rib that protrudes towards the second cartridge's horizontal portion, wherein the third cartridge's horizontal portion comprises a second rib that protrudes towards the fourth cartridge's horizontal portion, and wherein the electronics housing comprises a first recess that engages the first rib and a second recess that engages the second rib when the electronics housing is inserted.

18. The method of claim 17, wherein the second cartridge's horizontal portion comprises a third rib that protrudes towards the first cartridge's horizontal portion, wherein the fourth cartridge's horizontal portion comprises a fourth rib that protrudes towards the fourth cartridge's horizontal portion, and wherein the electronics housing comprises a third recess that engages the third rib and a fourth recess that engages the fourth rib when the electronics housing is inserted.

19. The method of claim 16, the electronics housing comprising a chamfered projection extending, the chamfered projection comprising a short edge and a long edge, which is longer than the short edge, that are parallel to a longitudinal axis of the electronics housing, wherein when the electronics housing is inserted into the cavity the short edge is inserted before the long edge.

20. The method of claim 19, wherein the electronics housing comprises at least two chamfered projections.

21. The method of claim 20, wherein the electronics housing comprises a threaded receiver to couple the electronics housing to the body.

* * * * *